United States Patent [19]

Tyrell et al.

[11] Patent Number: 4,929,716

[45] Date of Patent: May 29, 1990

[54] POLYOXYALKYLENE POLYIMIDE POLYMERS

[75] Inventors: John A. Tyrell, Dalton, Mass.; Russell J. McGready, Downingtown, Pa.

[73] Assignee: General Electric Company, Pittsfield, Mass.

[21] Appl. No.: 140,304

[22] Filed: Dec. 31, 1987

[51] Int. Cl.$^5$ ............................................. C08G 69/26
[52] U.S. Cl. .................................. 528/353; 528/125; 528/128; 528/229
[58] Field of Search ................ 528/353, 125, 128, 229

[56] References Cited

U.S. PATENT DOCUMENTS 4,742,153  5/1988  Sutton, Jr. ........................... 528/353

Primary Examiner—John Kight, III
Assistant Examiner—M. L. Moore
Attorney, Agent, or Firm—William F. Mufatti; Daniel DeJoseph

[57] ABSTRACT

Disclosed are polyoxyalkylene polyimide polyester polymers that have utility as thermoplastic molding compositions, diacid monomers useful for making said polyester polymers and poly(oxy alkylene) polyimides. The latter two compounds have utility as hot melt adhesives.

19 Claims, No Drawings

POLYOXYALKYLENE POLYIMIDE POLYMERS

Disclosed are polyoxyalkylene polyimide polyester polymers that have utility as thermoplastic molding compositions. In addition, novel diacid monomers have been discovered that have utility for making the novel polyoxyalkylene polyimide polyester polymers and also have utility in their own accord as hot melt adhesives.

SUMMARY OF THE INVENTION

The present invention is directed to thermoplastic elastomeric polyimide polyesters comprising the reaction product of (a) at least one low molecular weight diol; (b) at least one dicarboxylic acid or an ester forming reactive derivative thereof; and (c) at least one diacid derived from the following:

(i) at least one poly(oxy alkylene)diamine;
(ii) at least one tetracarboxylic acid or derivative thereof; and
(iii) at least one tricarboxylic acid or derivative thereof.

The above diacids are believed to be novel and are also claimed herein as monomers for making the polyimide polyesters of the present invention. Also disclosed are novel polymers that are the reaction product of a poly(oxy alkylene)diamine and a tetracarboxylic acid or derivative thereof. These polymers have utility as hot melt adhesives.

DETAILED DESCRIPTION OF THE INVENTION

The novel polyoxyalkylene polyimide polymers of the present invention comprise the reaction product of (a) at least one low molecular weight diol; (b) at least one dicarboxylic acid or an ester forming reactive derivative thereof; and (c) at least one diacid derived from the following:

(i) at least one poly(oxy alkylene)diamine;
(ii) at least one tetracarboxylic acid or derivative thereof; and
(iii) at least one tricarboxylic acid or derivative thereof.

These polymers are random polymers and are generally represented by repeating structural units of the following Formula I:

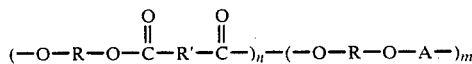

wherein n and m are 1 or more, wherein R and R' are the same or are different and are independently a bivalent organic radical, preferably a $C_2$ to $C_{20}$ aliphatic, aromatic or cycloaliphatic organic radical, A is the diacid monomer represented in Formula II below, minus the —OH groups present on each side of the monomer.

Suitable diols (a) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 300 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Preferably, the low molecular weight diol utilized in this invention will have the formula $$HO-R-OH$$

wherein R is as defined above.

The dicarboxylic acid or an ester forming reactive derivative thereof (b) will have the formula

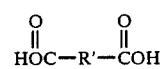

wherein R' is as defined above.

The diacid (c) utilized in the preparation of the novel polymers of this invention is believed to be novel and is derived from the following reactants:

(i) at least one poly(oxy alkylene)diamine;
(ii) at least one tetracarboxylic acid or derivative thereof; and
(iii) at least one tricarboxylic acid or derivative thereof.

Representative long chain ether glycols from which the polyoxyalkylene diamine is prepared by amination include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide, and methyl tetrahydrofuran. Polyformal glycols prepared by reacting formaldehyde with diols such as 1,4-butanediol and 1,5-pentanediol are also useful. Especially preferred are poly(alkylene ether)glycols and poly(tetramethylene ether)glycols, poly(propylene ether)glycols and poly(ethylene ether)glycols end capped with poly(propylene ether)glycol and/or propylene oxide.

In general, the polyoxyalkylene diamines useful in the practice of the present invention have an average molecular weight of from about 600 to about 12,000, preferably from about 900 to about 4,000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable, and preferably is substantially nonimidizable.

While trimellitic anhydride is preferred as the tricarboxylic acid component, any number of suitable tricarboxylic acid constituents will occur to those skilled in the art including 2,6,7-naphthalene tricarboxylic anhydride, 3,3′,4-diphenyl tricarboxylic anhydride, 3,3′,4-benzophenone tricarboxylic anhydride, 1,3,4-cyclopentane tricarboxylic anhydride, 2,2′,3-diphenyl tricarboxylic anhydride, diphenyl sulfone-3,3′,4-tricarboxylic anhydride, ethylene tricarboxylic anhydride, 1,2,5-naphthalene tricarboxylic anhydride, 1,2,4-butane tricarboxylic anhydride, 1,3,4-cyclohexane tricarboxylic anhydride, diphenyl isopropylidene, 3,3′4 tricarboxylic anhydride, 3,4 dicarboxyphenyl 3′-carboxylphenyl ether anhydride; etc.

These tricarboxylic acid materials can be characterized by the following general formula:

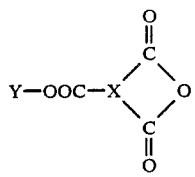

wherein:

X is a trivalent organic radical, preferably a $C_2-C_{20}$ aliphatic or cycloaliphatic, or $C_6-C_{20}$ aromatic trivalent radical;

Y is preferably hydrogen or a monovalent organic radical which is preferably selected from $C_1-C_6$ aliphatic and/or cycloaliphatic radicals and $C_1-C_{12}$ aromatic radicals, e.g., phenyl, tolyl or benzyl; Y is most preferably hydrogen.

The tetracarboxylic acid or derivative thereof utilized in the present invention will have the formula

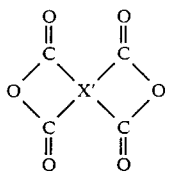

wherein X' is a tetravalent organic radical preferably a $C_2$ to $C_{20}$ aliphatic or cycloaliphatic, or $C_6-C_{20}$ aromatic tetravalent radical.

Briefly, these diacids may be prepared by known imidization reactions including melt synthesis or by synthesizing in a solvent system. For example, the ratio of the moles of the tetracarboxylic component to the tricarboxylic component can be varied. Preferably, the number of moles of the tetracarboxylic component and ½ of the moles of the tricarboxylic component will be equal to the number of moles of the diamine component. The reaction components are preferably reacted by refluxing at between about 100° C. to 300° C., preferably 150° C. to 250° C., in a suitable solvent such as dimethylformamide, diethylformamide, diethylacetamide, N-methylcaprolactam, or dimethylsulfoxide, among others known to those skilled in the art, or in an azeotropic mixture of said solvent with an additional inert solvent, e.g. xylene. The solvent is subsequently removed by distillation and the residual solvent removed by vacuum drying to leave the diacid. Alternatively the diacid may be prepared by melt synthesis wherein the tetracarboxylic component, tricarboxylic component and the diamine are heated at between 100° C. to 300° C., preferably 150° C. to 250° C., while drawing off water, for several hours to product the diacid. Preparation of the diacid or their esters is not meant to be limited to the procedure just described which are illustrative of synthetic methods known in the art.

The novel diacids of the present invention will have the following Formula II:

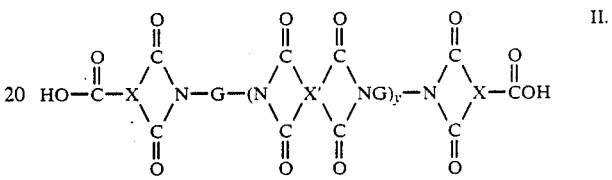

wherein y is 1 or greater.

The polyoxyalkylene polyimide polyester polymers of the present invention can be prepared readily by melt condensation procedures. Typically, the procedure involves the reaction of the polyoxyalkylene diimide diacids and the dicarboxylic acids with a low molecular weight diol. Initially, the reaction will take place at about atmospheric pressure while the temperature is increased to about 240°-300° C. while distilling off volatiles. Preferably, vacuum will be applied to aid in removal of volatiles.

The typical procedure for the preparation of these polymers can be varied widely. For example, as an alternative to the foregoing procedure, it is also possible, depending upon the reactants utilized, to directly charge the reactor system with the reactants rather than preform the diacid.

Both batch and continuous methods can be used for any stage of polymer preparation.

This invention also contemplates the formation of novel polyoxyalkylene polyimide polymers which comprise the reaction products of (i) at least one poly(oxy alkylene)diamine, and (ii) at least one tetracarboxylic acid or derivative thereof, as these terms are defined above. These polymers are useful as hot melt adhesives.

These polyoxyalkylene polyimide polymers can be prepared by melt condensation procedures. The procedure involves the reaction of the poly(oxy alkylene)diamine and the tetracarboxylic acid (or derivative thereof) at about atmospheric pressure. The temperature is gradually increased to about 240° C.-300° C. while distilling off volatiles.

The preparation of both of the polymers of this invention can be carried out in the presence of an antioxidant, as well as other stabilizers including thermal and UV stabilizers. While stabilizers are not normally required on a laboratory scale, their use, particularly oxidative and/or thermal stabilizers, is preferred on a commercial scale.

The novel polyoxyalkylene polyimide polymers of the invention have repeating structural units of the formula:

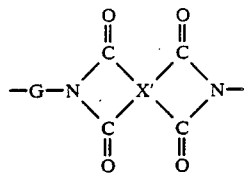

III.

wherein G and X' are as defined above.

Most any stabilizer known in the art for polyesters may be used including phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1lH,3H,5H)trione; N,N'-hexamethylene bis-(3,5-bi-tert-butyl-4-hydroxydrocinnamamide 4,4'-bis(2,6-ditertiary-butylphenol); 1,3,5-trimethyl-2,4,6-tris(3,5-ditertiary-butyl-4-hydroxybenzyl) benzene and 4,4'-butylidene-bis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis(a,a-dimethylbenzyl) diphenylamine, N; N'-bis(betanaphthyl)-p-phenylene diamine; N,N-bis(1-methylheptyl)-p-phenylene diamine and either phenylbeta- naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

DETAILED DESCRIPTION OF THE PREFERRED EMBODIMENTS

The following Examples are presented as illustrative of the present invention and are not to be construed as limiting thereof.

EXAMPLE 1

This example illustrates the preparation of a novel diacid monomer of the present invention. This monomer was found to be useful in and of itself as a hot melt adhesive or as an intermediate for the preparation of the novel polyesters of the present invention.

The preparation of this example illustrates a polyoxyalkylene polyimide bisacid derived from a long chain propylene ether diamine, a tricarboxylic acid derivative and a tetracarboxylic acid derivative.

Into a reactor vessel are placed 480 parts by weight of a polyoxyalkylene diamine (Jeffamine D400, a propylene ether diamine, average molecular weight 400), 174 parts by weight of 1,2,4,5-benzene tetracarboxylic anhydride (available from Aldrich Chemical Co.), and 154 parts by weight of trimellitic anhydride. The mixture is heated to about 180° C. whereupon water was generated. After 2 hours at 180° C., a phenolic antioxidant was added and the polyoxyalkylene polyimide bisacid cooled and a tacky polymer obtained, which had utility as a hot melt adhesive.

The viscosity was measured at 100° C. and determined to be 13,000 centipoise.

I.R. spectrum was obtained (1972, 1771, 1713, 1375, 1358, 1105 cm-1).

EXAMPLE 2

This example illustrates a polyoxyalkylene polyimide polyester derived from butanediol, dimethyl terephthalate, and a polyoxyalkylene polyimide bisacid (derived from a long chain propylene ether diamine, a tricarboxylic acid derivative and a tetra carboxylic acid derivative).

Into a reactor are placed 193 parts by weight of butanediol, 175 parts by weight of a polyoxyalkylene polyimide bisacid (derived from 480 parts by weight Jeffamine D400 (a propylene ether diamine), 154 parts by weight trimellitic anhydride, and 174 parts by weight of 1,2,4,5-benzene tetracarboxylic acid anhydride), 250 parts by weight of dimethyl terephthalate, a phenolic antioxidant, and a titanium catalyst. The mixture is heated to about 180° C. whereupon methanol was generated. After the theoretical amount of methanol is removed the pot temperature is increased to about 250° C. and a vacuum applied to produce the polyester. The melting point of the polymer was determined to be 198° C. The polymer was found to have utility as a molding composition exhibiting higher thermal capabilities.

Comparative Example

This example illustrates a polyoxyalkylene polyimide polyester that is outside the scope of the present invention. This polyester is derived from butanediol, dimethyl terephthalate, and a polyoxyalkylene polyimide bisacid (derived from a long chain propylene ether diamine, and a tricarboxylic acid derivative.

Into a reactor vessel are placed 193 parts by weight of butanediol, 175 parts by weight of a polyoxyalkylene bisimide bisacid (derived from 200 parts by weight Jeffamine D400 (a propylene ether diamine) and 194 parts by weight trimellitic anhydride), 250 parts by weight of dimethyl terephthalate, a phenolic antioxidant, and a titanium catalyst. The mixture is heated to about 180° C. whereupon methanol was generated. After the theoretical amount of methanol is removed the pot temperature is increased to about 240° C. and a vacuum applied to produce the polyester. The melting point of the resulting polyester was found to be 181° C.

The melting point of Example 2 of the invention is higher (indicating a higher practical use temperature) than that of the Comparative Example.

EXAMPLE 3

This example illustrates a polyoxyalkylene polyimide derived from a poly(propyleneoxide)diamine and a tetracarboxylic acid derivative.

Into a reactor vessel, equipped with a Dean Stark trap, are placed 50 parts by weight of Jeffamine D400 (a propylene ether diamine, average molecular weight 400), 27.2 parts by weight of 1,2,4,5-benzene tetracarboxylic acid anhydride, and 200 parts by weight xylenes (solvent). The mixture is heated to reflux, whereupon water was generated. The water is removed by azeotropic distillation, and then the Dean Stark trap removed and distillation (of xylenes) continued. The pot temperature is increased to about 240° C. and a vacuum applied to produce the polyetherimide.

The viscosity was measured at 150° C. and determined to be 64,100 centipoise.

I.R. Spectrum was obtained (1965, 1766, 1715, 1381, 1357, 1096 cm-1).

The resulting polymer was tacky and had other physical properties consistent with hot melt adhesives.

EXAMPLE 4

This example illustrates a polyoxyalkylene polyimide derived from a poly(propyleneoxide)diamine and a tetracarboxylic acid derivative.

Into a reactor vessel are placed 100 parts by weight of Jeffamine D400 (a propylene ether diamine, average molecular weight 400) and 130 parts by weight of BPA-DA. The mixture is heated to about 180° C. whereupon water was generated. The pot temperature is increased to about 240° C. to produce the polyetherimide.

The viscosity was measured at 220° C. and determined to be 13,300 centipoise.

I.R. spectrum was obtained (2965, 1770, 1708, 1373, 1100 cm-1).

The resulting polymer was tacky and had other physical properties consistent with hot melt adhesives.

What is claimed is:

1. A polyoxyalkylene polyimide polyester composition which is the reaction product of:
   (a) at least one low molecular weight diol;
   (b) at least one dicarboxylic acid; and
   (c) at least one diacid derived from:
      (i) at least one poly(oxy alkylene)diamine;
      (ii) at least one tetracarboxylic acid or derivative thereof having the formula:

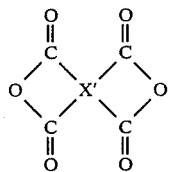

wherein X' is a tetravalent organic radical; and
      (iii) at least one tricarboxylic acid or derivative thereof having the formula

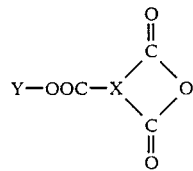

wherein:
X is a trivalent organic radical; and
Y is hydrogen or a monovalent organic radical.

2. The composition of claim 1 wherein said diol has a molecular weight of about 300 or less.

3. The composition of claim 2 wherein said diol contains from about 2 to about 15 carbon atoms.

4. The composition of claim 3 wherein said diol was selected from butanediol, butenediol, hexanediol, cyclohexane dimethanol, or mixtures thereof.

5. The composition of claim 4 wherein said diol is butanediol.

6. The composition of claim 1 wherein said dicarboxylic acid or its derivative is an aromatic dicarboxylic acid or its derivative.

7. The composition of claim 6 wherein said aromatic dicarboxylic acid or its derivative is dimethyl terephthalate.

8. The composition of claim 1 wherein the poly(oxy alkylene)diamine has an average molecular weight of from about 600 to about 12000.

9. The composition of claim 8 wherein said poly(oxy alkylene)diamine has an average molecular weight of from about 900 to about 4000.

10. The composition of claim 8 wherein said poly(oxy alkylene)diamine is selected from poly(ethylene ether)diamine, poly(propylene ether) diamine, poly(tetramethylene ether)diamine, copoly(propylene ether)ethylene, ether(diamine) or mixtures thereof.

11. A diacid composition useful as a hot melt adhesive which is the reaction product of:
   (i) at least one poly(oxy alkylene)diamine;
   (ii) at least one tetracarboxylic acid or derivative thereof; and
   (iii) at least one tricarboxylic acid or derivative thereof.

12. The composition of claim 11 wherein the poly(oxy alkylene)diamine has an average molecular weight of from about 600 to about 12000.

13. The composition of claim 12 wherein said poly(oxy alkylene)diamine has an average molecular weight of from about 900 to about 4000.

14. A polyoxyalkylene polyimide polymer composition which is the reaction product of:
   (i) at least one poly(oxy alkylene)diamine; and
   (ii) at least one tetracarboxylic acid or derivative thereof.

15. The composition of claim 14 wherein the poly(oxy alkylene)diamine has an average molecular weight of from about 600 to about 12000.

16. The composition of claim 15 wherein said poly(oxy alkylene)diamine has an average molecular weight of from about 900 to about 4000.

17. The composition of claim 1 wherein the tetravalent organic radical is preferably a $C_2$ to $C_{20}$ aliphatic or cycloaliphatic, or $C_6$–$C_{20}$ aromatic tetravalent radical.

18. The composition of claim 1 wherein the monovalent organic radical is preferably selected from $C_1$–$C_6$ aliphatic and/or cycloaliphatic radicals and $C_1$–$C_{12}$ aromatic radicals.

19. The composition of claim 1 wherein Y is hydrogen.

* * * * *